United States Patent [19]

Preston et al.

[11] Patent Number: 5,250,279
[45] Date of Patent: Oct. 5, 1993

[54] METHOD FOR THE MANUFACTURE OF HYDROTALCITE

[75] Inventors: Barry W. Preston, Whiteford; John A. Kosin, Bel Air; Claude R. Andrews, Pasadena, all of Md.

[73] Assignee: J. M. Huber Corporation, Rumson, N.J.

[21] Appl. No.: 812,195

[22] Filed: Dec. 20, 1991

[51] Int. Cl.$^5$ .................. C01B 31/24; C01F 5/24; A01N 59/06; A61K 33/06

[52] U.S. Cl. .................. 423/432; 423/420.2; 424/686; 424/688

[58] Field of Search .............. 423/419 R, 419 P, 430, 423/432; 424/686, 682; 106/463

[56] References Cited

U.S. PATENT DOCUMENTS

| | | | |
|---|---|---|---|
| 3,099,524 | 7/1963 | Grossmith | 424/686 |
| 3,650,704 | 3/1972 | Kumura et al. | 423/419 P |
| 4,883,533 | 11/1989 | Kosin et al. | 423/308 |
| 4,904,457 | 2/1990 | Misra | 423/430 |
| 5,078,983 | 1/1992 | Herold | 424/686 |

Primary Examiner—Michael Lewis
Assistant Examiner—Stephen G. Kalinchak
Attorney, Agent, or Firm—Harold H. Flanders; Robert L. Price

[57] ABSTRACT

An improved method for the production of synthetic hydrotalcites having high purity (99+%) and small particle size (<2 microns) is disclosed. This method used inexpensive and available reactants and is suitable for commercial scale production. A source of magnesium, such as magnesium hydroxide; a source of aluminum from a mixture of alumina trihydrate and an alkali metal aluminate; and a source of carbonate, such as sodium bicarbonate, are reacted under hydrothermal conditions at a temperature of between 160°-200° C. to produce synthetic hydrotalcite.

8 Claims, No Drawings

METHOD FOR THE MANUFACTURE OF HYDROTALCITE

FIELD

This invention relates to an improved method for the manufacture of a synthetic hydrotalcite.

BACKGROUND

Hydrotalcite is a known natural mineral which is produced in relatively small amounts in limited areas. Hydrotalcite is known as an antacid which has a neutralizing effect on gastric juices. It is also known to produce synthetic hydrotalcites by the reaction of a carbonate source, a magnesium source and an aluminum source. U.S. Pat. Nos. 3,539,306 and 3,650,704 to Kumura et al discloses synthetic hydrotalcites and methods for manufacture of synthetic hydrotalcites. The synthetic hydrotalcite is described as having the following composition:

$$6MgO \cdot Al_2O_3 \cdot CO_2 \cdot 12H_2O$$

According to these patents, the hydrotalcite is produced by the reaction of an aluminum component, which can be a water soluble aluminate, a magnesium component, which can be magnesium oxide or magnesium hydroxide, and a carbonate component, such as an alkali or alkaline earth bicarbonate in an aqueous medium at a temperature of 0°–150° C. at a pH of at least 8. These patents also discuss prior art procedures for preparing synthetic hydrotalcites which include the use of dry ice or ammonium carbonate as the carbonate source and using high temperatures and/or elevated pressures.

Hydrotalcites which have needlelike crystalline structures are described in U.S. Pat. No. 4,351,814 to Miyata. These hydrotalcites being prepared by reaction of a basic magnesium compound in the form of needlelike crystals with an aluminum cat ion under conditions which do not cause a loss of a needlelike crystalline shape of the basic magnesium compound. The reaction is carried out under a reaction temperature of about 90° to 150° C. These fibrous crystals are said to be useful as flame retardants for thermoplastic and thermosetting resins.

U.S. Pat. No. 4,629,626 to Miyata et al discloses a hydrothermally treated product useful for treating an iron deficiency, which compound has a hydrotalcite like crystal structure and includes iron, magnesium aluminum, and water within the structure. This product is prepared by an iron source, such as ferrous chloride with aluminum chloride and sodium hydroxides.

U.S. Pat. No. 4,883,533 to Kosin et al discloses a method for the manufacture of hydrotalcite and a modified synthetic hydrotalcite so produced. The preparation of the initial synthetic hydrotalcite takes place in an aqueous system which includes a source of magnesium, a source of aluminum and a source of carbonate. The magnesium source may be magnesium oxide, magnesium hydroxide, magnesium carbonate and other water soluble magnesium salts. The aluminum may be present as an aluminum salt including aluminum hydroxide, aluminum carbonate, aluminum alcoholates and other water soluble aluminum salts such as alkaline metal aluminates with the preferred aluminum source being sodium aluminate or as aqueous solution of solid alumina trihydrate. The carbonate reactant includes earth metal bicarbonates and alkaline metal bicarbonates with sodium bicarbonate as the preferred reactant. These reactants are reacted in a hydrothermal condition at 150°–200° C. for one to three hours to produce a hydrotalcite having average particle size of about one micron with a platelet morphology. When sodium aluminate is used as the aluminum source, the hydrotalcite is approximately 98 percent purity by x-ray diffraction analysis.

There remains a need in the art for an improved method of producing hydrotalcite having both a 99+% purity and small particle size using inexpensive, commercially available reactants.

SUMMARY OF THE INVENTION

A method for the preparation of the high purity synthetic hydrotalcite having a small platelet morphology is disclosed. The method comprises reacting a mixture of a magnesium source, such as magnesium oxide or magnesium hydroxide, with an alkali metal bicarbonate, solid alumina trihydrate and an alkali metal aluminate under aqueous hydrothermal conditions at a temperature of about 160°–200° C. The method takes place such that the molar ratio of the alumina trihydrate to the alkali metal aluminate in the reaction is between about 10:1 to about 5:1 and the molar ratio of the magnesium compound to the alkaline metal bicarbonate is about 0.9:1 to about 1.1:1 and the atomic ratio of the magnesium to total aluminum ion in the reaction is about 2.25:1.

It is an object of the present invention to provide a novel method for the production of synthetic hydrotalcite utilizing inexpensive, commercially available reactants.

It is another object of the present invention to provide a method for the manufacture of a synthetic hydrotalcite which has a purity of 99+ percent while maintaining a platelet morphology having average particle size below substantially 2 microns.

BEST MODE FOR CARRYING OUT THE INVENTION

As indicated above, this application is directed to a novel method for the manufacture of synthetic crystalline hydrotalcite, which is a basic magnesium aluminocarbonate hydrate. The product resulting from the novel method is 99+ percent pure while maintaining a small particle size. According to this novel process, a source of magnesium, a source of aluminum, and a source of carbonate are reacted in a pressurized reactor at a temperature between 160°–200° C. to produce hydrotalcite.

The basic reaction for preparation of the synthetic hydrotalcite includes a source of magnesium. The magnesium source may be selected from the group consisting of magnesium oxide or magnesium hydroxide. Contrary to the teaching of the prior art, other magnesium sources, such as magnesium carbonate and water soluble magnesium salts are inapplicable in the present invention. Magnesium hydroxide is the preferred reactant, usually as an aqueous slurry, preferably of about 40 to 60 percent solids.

It has been found a critical feature of the present invention that the aluminum be present from combined sources of alkali metal aluminate, preferably sodium aluminate, and solid alumina trihydrate. The proper ratio of the alkali metal aluminate and solid alumina trihydrate produces the unique method of the present invention. It is a discovery of the present invention that the molar ratio of the alumina trihydrate to the alkali metal aluminate must be between about 10:1 to 5:1 with 9-7:1 preferred and 8:1 most preferred. Another important feature is that the molar ratio of the alkali metal aluminate, preferably sodium aluminate ($Na_2O/Al_2O_3$), should be as low as possible, i.e. low alkali metal. In the process of the present invention, as the molar ratio of the alkaline metal aluminate increases from 1.25, the possibility of producing some dawsonite along with hydrotalcite increases. If the molar ratio of the alkali metal aluminate is as high as 1.5, dawsonite contaminant is also produced. The preferred alkali metal aluminate, sodium aluminate, is commercially available at a molar ratio of 1.25 $Na_2O/Al_2O_3$ and it is most preferred. However, if a sodium aluminate having a molar ratio of less than 1.25 were available, it would be more preferred. In addition to avoiding the production of dawsonite contaminant which is unacceptable, excess sodium also results in unfavorable economics and makes a product more difficult to wash. If desired a Bayer liquor, sodium aluminate with some sodium carbonate, may be acceptable if the reaction is adjusted accordingly.

The carbonate reactant is preferably present as alkali metal bicarbonate, or less preferably carbon dioxide and mixtures thereof. Sodium bicarbonate is the preferred reactant. It is interesting to observe that alkali metal carbonates by contrast are unacceptable for use in the present invention. Another critical aspect of the present invention is the ratio of magnesium compound to the bicarbonate compound. This ratio must be kept in the range of substantially 0.9:1 to 1.1:1. If the ratio of magnesium to bicarbonate is much less than 0.9, dawsonite contaminant is also produced. If the ratio gets much above 1.1, the end product loses its high purity.

These reactants are brought together in a closed reactor in an aqueous medium to react under hydrothermal conditions. The mixture is then heated at a temperature of about 160°-200° C. for about 1 to 3 hours. Again, in the process of the present invention, the reaction temperature takes on greater significance than taught in the prior art. At temperatures below about 160° C., the reaction proceeds very slowly if at all and at temperatures above about 200° C., dawsonite contaminant is again produced. The more preferred temperature range would be 170°-190° C. with 175° C. most preferred. After the reaction, the product is isolated by filtration and dried at an elevated temperature. The resulting hydrotalcite is easy to filter and the dried product is very friable. The resulting hydrotalcite has an average particle size less than about 2 microns with less than 1 micron typical. The particle produced is platelet in nature and has a purity of 99+ percent with 100 percent hydrotalcite typical.

In the preferred embodiment of the present invention, it has been discovered that this novel reaction proceeds according to the following molar ratios using the preferred reactants:

$$aMg(OH)_2 + bAl(OH)_3 + c(dNa_2O/Al_2O_3) + 1.85\text{-}H_2O + fNaHCO_3 \rightarrow MgO.Al_2O_3.CO_2.gH_2O + h\text{-}Na_2CO_3 + iNaHCO_3$$

wherein a equals 4.4-4.6, d<1.5, b/c=5-10, a/f - 0.9-1.1, h and i are positive numbers.

It may be seen that the atomic ratio of magnesium to total aluminum ion from all sources is substantially 2.25:1, i.e. about 2.2-2.3:1.

The hydrotalcite so produced in high purity with small particle size is now suitable for use as a stabilizer and acid acceptor in polymer systems such as polypropylene, polyvinyl chloride, chlorosulfoated polyethylene, etc.

The following examples are presented to illustrate the novel nature of the invention but it is not to be considered as limited thereto. In the examples and throughout the specification, parts are by weight unless otherwise indicated.

Comparative Example No. 1

A total of 1,594 grams of water, 250 grams of a $MgOH_2$ in slurry (55% solids), 240 grams of sodium aluminate solution (molar ratio of 2.0$Na_2O/Al_2O_3$) and 204 grams of $NaHCO_3$ was placed in a stirred one-gallon Parr reactor. The reactor was heated to 175° C. and stirred for 2 hours. The product was isolated by filtration and dried at 105° C. The resulting hydrotalcite was found to be 98% pure by x-ray diffraction analysis (XRD). The molar ratios of the reactants are as follows:

| REACTANTS | MOLAR RATIO |
|---|---|
| $Mg(OH)_2$ | 5.04 |
| $Al_2O_3$ | 1.00 |
| $CO_2$ | 5.13 |

It has been found that on a small laboratory scale, the purity of the hydrotalcite produced by this method is approximately 98 percent. As this method is scaled up to commercial capacity the purity may drop as low as 95 percent due to physical mixing limitations.

Comparative Example No. 2

A total of 2,475 grams of water, 391.4 grams of $MgOH_2$ slurry (55% solids), 128.7 grams of alumina-trihydrate solid (average particle size 2 microns) and 188.1 grams of $NaHCO_3$ was placed in a stirred one-gallon Parr reactor. The reactor was heated to 175° C. and stirred for 2 hours. Hydrotalcite was isolated by filtration and dried at 105° C. The resulting hydrotalcite was platelet in nature and had an average particle size of 2 to 3 microns with a purity by x-ay diffraction of about 95 percent.

It has been found that when 100 percent of the aluminum comes from 1 micron solid ATH and the above method is used, product purities approaching 100 percent can be obtained in some instances. However, the particle size of the product was always in excess of 2 microns, often ranging up to 4 or 5 microns. As the process was increased in scale, the size of the particles also increased due to mixing limitations.

A chemical analysis of the synthesized hydrotalcite produced above was performed and the following empirical formula was derived:

$$4.5MgO.Al_2O_3.CO_2.10H_2O$$

Example 3

A total of 1,125 grams of $H_2O$ was added to a 2-liter Parr pressure reactor followed by 141 grams of $NaHCO_3$, 192 grams of $MgOH_2$ in slurry (51% solids), 46.8 grams of alumina trihydrate (average particle size 1-2 microns) and 30.6 grams of sodium aluminate solution (molar ratio 1.25$Na_2O/Al_2O_3$). The reaction slurry was continuously agitated, heated to 175° C. and allowed to react for 2 hours. The hydrotalcite was then isolated by filtration and washed with 500 ml. of hot water. The resultant wet cake was dried at 105° C. overnite and then hammer milled. The product produced was hydrotalcite having 100 percent purity by x-ray diffraction having a platelet morphology with 77 percent of the platelets falling between 0.5 and 1.5 microns by Coulter counter analysis. The product had an average particle size of about 1 micron. The molar ratio of $Al(OH)_3$ to sodium aluminate is 8 to 1. The molar ratio of the magnesium source to the bicarbonate source is 0.98:1 and the atomic ratio of magnesium source to the total aluminum ion from all sources is 2.25:1.

The purity of hydrotalcite is very important in determining its functionality in acid acceptor/stabilizing applications. For instance hydrotalcite is added to polyvinyl chloride formulations to function as an acid acceptor and thus enhance thermal stability. Hydrotalcite is known to react with HCl generated as the polyvinyl chloride begins to degrade to form the insoluble chloride form of hydrotalcite. A trace amount (2 to 5 percent) of magnesium hydroxide contaminant reacts to form the soluble magnesium chloride. Soluble chloride can cause yellowing of the PVC and aid in early degradation.

Hydrotalcite containing 2 percent $MgOH_2$ was added (0.5 phr) to a PVC formulation and compared with the hydrotalcite of 100 percent purity of the present invention. The samples containing the hydrotalcites were oven aged at 190° C. and the samples were removed and examined every 5 minutes. It was found that after approximately 40 minutes the PVC containing 98 percent purity hydrotalcite went from a light yellow color to black signifying degradation. The PVC sample containing 100 percent purity hydrotalcite did not degrade until after approximately 60 minutes. Accordingly, it may be seen that the performance characteristics of a 98 percent hydrotalcite vs. 100 percent purity hydrotalcite is significant.

The invention has been described herein with reference to certain preferred embodiments; however, as obvious variations thereon will become apparent to those skilled in the art, the invention is not to be considered as limited thereto.

We claim:

1. A method for the preparation of synthetic hydrotalcite having a purity of above 99 percent, a platelet morphology and an average particle size of less than about 2 microns comprising:

reacting a magnesium compound, a bicarbonate compound, alumina trihydrate and an alkali metal aluminate under hydrothermal conditions at a temperature of about 160°-200° C., wherein the magnesium compound is selected from a member of the group consisting of magnesium oxide and magnesium hydroxide and mixtures thereof, the molar ratio of the alumina trihydrate to the alkali metal aluminate being between about 10:1 to about 5:1, the molar ratio of the magnesium compound to the bicarbonate compound being between about 0.9:1 to about 1.1:1, and the atomic ratio of the magnesium to the total aluminum ion being between about 2.2:1 to about 2.3:1.

2. The method of claim 1 wherein the molar ratio of the alumina trihydrate to the alkali metal aluminate is about 9:1 to about 7:1.

3. The method of claim 2 wherein the molar ratio of the alumina trihydrate to alkali metal aluminate is about 8:1.

4. The method of claim 1 wherein the molar ratio of the magnesium source to the bicarbonate is about 0.95:1 to about 1.05:1.

5. The method of claim 1 wherein the mixture is reacted at a temperature of about 170°-190° C.

6. The method of claim 5 wherein the mixture is reacted at about 175° C.

7. The method of claim 1 wherein the alumina trihydrate is a powder having an average particle size of about 1 to 2 microns.

8. The method of claim 1 wherein the magnesium source is magnesium hydroxide, the alkali metal bicarbonate is sodium bicarbonate and the alkali metal aluminate is sodium aluminate wherein the molar ratio of the alumina trihydrate to sodium aluminate is about 8:1 and the molar ratio of the magnesium hydroxide to sodium bicarbonate is approximately 0.95:1 to about 1.05:1.

* * * * *